United States Patent [19]

Nitschke et al.

[11] Patent Number: 4,853,932
[45] Date of Patent: Aug. 1, 1989

[54] METHOD OF MONITORING AN ERROR CORRECTION OF A PLURALITY OF COMPUTER APPARATUS UNITS OF A MULTI-COMPUTER SYSTEM

[75] Inventors: Werner Nitschke, Ditzingen; Hugo Weller, Oberriexingen; Wolfgang Drobny, Besigheim; Peter Taufer, Renningen, all of Fed. Rep. of Germany

[73] Assignee: Robert Bosch GmbH, Stuttgart, Fed. Rep. of Germany

[21] Appl. No.: 107,386

[22] Filed: Oct. 9, 1987

[30] Foreign Application Priority Data

Nov. 14, 1986 [DE] Fed. Rep. of Germany ....... 3639055

[51] Int. Cl.⁴ ............................................. G06F 11/00
[52] U.S. Cl. ..................................... 371/68; 364/200; 364/424.01; 371/9; 371/16
[58] Field of Search .................. 371/68, 9, 19, 8, 11, 371/12, 16; 364/200, 900, 424.01, 426.01

[56] References Cited

U.S. PATENT DOCUMENTS

| | | | |
|---|---|---|---|
| 3,517,174 | 6/1970 | Ossfeldt | 371/12 |
| 3,876,987 | 4/1975 | Dalton et al. | 364/200 |
| 3,898,621 | 8/1975 | Zelinski et al. | 371/68 |
| 4,030,074 | 6/1977 | Giorcelli | 371/68 |
| 4,049,957 | 9/1977 | Kera et al. | 371/11 |
| 4,198,678 | 4/1980 | Maatje et al. | 371/9 |
| 4,392,199 | 7/1983 | Schmitter et al. | 371/11 |
| 4,616,312 | 10/1986 | Uebel | 371/11 |

Primary Examiner—A. D. Pellinen
Assistant Examiner—Geoffrey S. Evans
Attorney, Agent, or Firm—Frishauf, Holtz, Goodman & Woodward

[57] ABSTRACT

To permit rapid checking of possible malfunctions or erroneous computations in data processing cycles, in which a plurality of computer units carry out processing of data, especially to supervise and control safety apparatus, each one of the units generate intermediate information data at predetermined time intervals, which intermediate information data are transmitted to each one of the other units. The so-received intermediate information data are buffer-stored and compared in all the units with locally generated check data. If the comparison indicates coincidence, computation is continued through subsequent processing cycles; if an error is detected, at least that computer unit which processes the data erroneously is reset to repeat at least the preceding computation cycle, and the unit which detected the error is placed into a "set-and-hold" mode. The intermediate information data may be derived, for example, in form of a quotient of a beginning and terminal address; additionally, the time of arrival of the intermediate information data can be checked against a time marker, thereby detecting and providing for correction of both computation as well as timing errors.

18 Claims, 2 Drawing Sheets

METHOD OF MONITORING AN ERROR CORRECTION OF A PLURALITY OF COMPUTER APPARATUS UNITS OF A MULTI-COMPUTER SYSTEM

Reference to related applications, assigned to the Assignee of the present application, the disclosure of which are hereby incorporated by reference:

U.S. application Ser. No. 07/107.379, filed Oct. 9, 1987 Werner Nitschke, Hugo Weller, Wolfgang Drobny, Peter Taufer and Edmund Jeenicke.

U.S. application Ser. No. 07/107,382, filed Oct. 9, 1987 Werner Nitschke, Hugo Weller, Wolfgang Drobny and Peter Taufer.

The present invention relates to a method and system for monitoring the performance of a plurality of computer apparatus units in a multi-unit system, and for correction of errors if parallel computation of data in respective units indicates a deviation of results. The invention is particularly applicable to such a multi-unit system for processing data in processing cycles, particularly for a multi-unit system which supervises and controls safety apparatus and especially safety apparatus in automotive vehicles such as brake anti-lock systems, airbags, or safety belt tensioning or tightening or locking systems. The invention is applicable, in general, to all types of computer controlled operating systems in which reliability of carrying out computer commands is of utmost importance, for example for safety reasons, while reliably preventing operation of operating elements if a dangerous situation does not exist to avoid false or erroneous operation of operating elements which, under conditions of normal functioning of other apparatus might then cause dangerous conditions to arise.

Process control computers are increasingly used in order to control complex and rapidly proceeding control steps. Process computers are capable of processing a substantial quantity of data from which operating signals are to be derived. Process computers, particularly when installed in vehicles and subject to randomly occurring stray signals are, however, subject to malfunction. Typically, process computers whether installed in a fixed location or in a moving vehicle, are subject to interference due to stray sparking, arcing, radio and other communication signals, electric discharges, and interferences due to switching pulses occurring on power lines and which are coupled to the computer apparatus through stray coupling inductances or capacities. Thus, monitoring of the operation of the computer system or network is necessary.

The well-known arrangements to monitor operation of computer apparatus are not always sufficient when the computer is to control safety equipment. This can be demonstrated as an example using a passive passenger restraint system in an automotive vehicle, for example an airbag.

In an airbag passenger restraint system, passengers are to be protected against collision with interior components of the vehicle upon collision of the vehicle with an obstruction, which may be another vehicle. Airbags are triggered in that, shortly after the vehicle experiences a collision, an electrically ignited gas cartridge emits, rapidly, gas into the airbag to be placed between the passengers and the interior components of the vehicle.

Airbag protective systems, or other systems are triggered by continuously sensing acceleration and deceleration of the vehicle and processing the sensed information. When the vehicle hits an obstruction, these values can be represented as a curve having minima and maxima, respectively, well-known as a crash curve. The triggered instant for the gas cartridge, or for locking a belt restraint system or for some other system, then must occur at a precise instant of time which can be determined by experiments. The requirement of reliable response of the restraint system is, however, equally as important as the reliable protection against erroneous, or inadvertent triggering. Otherwise, if an airbag would suddenly explode under normal operation, the visibility of the roadway, for driving, would be impaired; the surprise trigger might, additionally, cause the driver to react such that an accident might occur merely because the gas bag, or restraint system has operated without any reason therefor.

Monitoring systems as generally used and known are not capable of preventing an erroneous triggering. In the same instant in which, in case of malfunction, an erroneous triggering would be indicated, it would be too late to prevent firing of the gas cartridge; it would have been, irreversibly, fired and the gas filling of the airbag could no longer be prevented.

The foregoing is merely an example; there are many instances, also in the field of machine tools and the like, chemical and other processes which are not concerned with safety as such, where malfunction which simulates, or indicates a specific condition, could cause extensive damage.

Multiple unit computer systems are frequently used for rapid processing of substantial quantity of data in the shortest period of time, a condition which frequently arises in monitoring, controlling and sequencing processes, or when data have to be derived from substantial data memory or storage facilities. Frequently, a plurality of computer units are used to carry out a common task and process data, in common, in which processed and new data are interchanged between the respective computer units. Safety systems and, for example, the safety systems in automotive vehicles, frequently use such multiple unit systems.

Multiple unit systems are subject to interference with the programming sequence by external influences. Typical external influences are disturbances due to sparking or arcing of extraneous circuits, disturbances by radio and other communication transmitters, variations in network voltages, dropout of network supply, switching pulses or dips due to connection or disconnection of substantial loads from a network, or induced pulses due to stray coupling with other networks, for example in an automotive vehicle, due to the presence of transmission lines, electric railway supply systems or the like. If computer apparatus which may be disturbed by such extraneous influence are part of the safety system, the result of a disturbance might be malfunction under emergency conditions or, what is equally worse, erroneous triggering due to simulation of an emergency condition. Substantial damage may also occur in multiple computer unit systems where the computer units are not used for safety or protective application, for example in the control of machine tools and the like where erroneous outputs may result in substantial damage.

Modern computer units operate at extremely high computation speed. Due to the complexity of multiple unit systems, it may be too late to interfere with corrective invasion of the system if a disturbance is already apparent in a result. It is, thus, necessary to closely monitor the operation of the respective units of a multiple unit system so that, as soon as a disturbance is detected, counter measures can be taken.

SUMMARY OF THE INVENTION

It is an object to provide a method and system for monitoring computer units in a multiple unit system and to correct errors, so that disturbances can be detected early at a time where it is still possible to prevent the consequences of disturbances and to correct errors which may have occurred without interfering, insofar as possible, with a further operation of the computer units or the systems.

Briefly, in each of the computer apparatus units, and at predetermined time intervals, for example, intermediate information data are generated. The intermediate information data are transmitted to each of the units, for example by transmission between the units themselves. The intermediate information data are compared with check data within the respective units and, if the comparison in any one of the units between the intermediate information data and the check data (a) detects coincidence, processing of the data will be continued; alternatively, (b) if a deviation is detected, a subsequent computation cycle is suppressed in at least that one of the units in which the arrow was detected, and repetition of computation of at least one preceding computation cycle by the at least one unit is commanded.

The system permits evaluation of information generated during the course of the program, that is, intermediate information. Evaluating intermediate evaluation in the course of the program, or of results obtained as the program runs it course, permits detection of disturbances already at the end of the respectively supervised computation cycle and thus, in most instances, substantially earlier than if the entire program had run its course. It has been found, statistically, that disturbances may occur with the same probability in the first, the last, or any intermediate computation cycle; by monitoring the respective computation cycles up to the occurance of the last computation cycle, early recognition of malfunction is thus possible.

The computer units can monitor each other; such mutual interaction is possible, based on the consideration that external influences do not interfere with different computer apparatus in the same manner, or result in the same interference result, particularly if the respective apparatus units are physically separated from each other, that is, are positioned at different locations. Thus, mutual recognition of disturbances within the program course is usually not prevented. Even possibly balancing disturbances can be effectively excluded by generating intermediate information, and/or check valves, for comparison purposes by different processing steps or methods.

Early recognition of disturbances provides a good basis to prevent the consequences of disturbances, and affords the possibility of rapid correction of any errors which are detected. If the disturbances occur in a cycle of a program which precedes the last monitored computation cycle, suitable control commands can be generated to prevent undesired consequences of the disturbance to occur. Even disturbances which occur in the last programming cycle, however, for example disturbances which may then control an operating element to operate, which, if it does based on the disturbance, may have dangerous consequences, the possibility still pertains to prevent transmission of erroneous control commands if the arrangement is so made that the operating commands are carried out only with some delay interval. The consequences of a disturbance can be avoided by, for example, suppressing a subsequent computation cycle or an execution command cycle.

Correction of errors is obtained, independently of the type and gravity of the error by resetting at least that one of the computation units which indicates a deviation. This may very well lead to reestablishing proper computation since many disturbances are short-term and, after the disturbance has dissipated itself, the particular apparatus unit may operate properly. This, then, is the fastest possibility by mere repetition of a prior computation operation to then obtain correct results. Early recognition of the disturbance, and resetting—just as early—permits consideration of the data which arose before the programming course was disturbed, so that no interruption of computation actually results. Disturbances which, however, are recognized only at a later point in the course of the program, permit further computation of the data at the earliest possible time in the overall processing course, so that any gaps which may have occurred are bridged. The particular computation unit or apparatus unit need repeat only one or a few computation cycles in dependence on the number of computation cycles within a program which have already been carried out, before the disturbance arose. It is simple to mark the computation cycles which checked and proved in order, so that only the disturbed cycles have to be repeated.

In accordance with a feature of the invention which is particularly suitable, a predetermined number of computation cycles are carried out and the intermediate information data is then transmitted within a first time interval to the other apparatus units, and received therein; in a second, subsequent time interval, the intermediate information is buffer-stored and compared with check data in the respective apparatus units.

Computation cycles, as used herein, are defined as programming steps in which the intermediate information can be so changed that proper carrying out of the program steps can be judged based on the result of the intermediate information. One or more clock pulses may be necessary to carry out one computation cycle. The time interval which is necessary for exchange in comparison of intermediate information, which must be deducted from the computation time as such, has to be suitably selected, so that an optimum compromise can be selected based on the number of computation cycles to be carried out, in view of high overall computation speed and monitoring of the operation without gaps or breaks.

In accordance with a preferred feature of the invention, intermediate information as such and/or the temporal receipt of this intermediate information is compared with check or test values.

By utilizing time as a factor besides the information data themselves, two respectively independent test possibilities are provided, and the recognition of disturbances is improved. Possible time shift between the program courses of the respective computer or computation units may be considered to be due to disturbances of synchronization but might result in erroneous intermediate information only in subsequent computation cycles. Such a disturbance, thus, can be readily corrected, in accordance with a feature of the invention, already at an earlier time by testing or checking the arrival time of previously calculated intermediate information. This measure, therefore, increases the availability for data processing of a multiple apparatus unit system.

Various alternatives can be used to control the computer units to correct errors. For example, upon determination of a deviation, all computer units of the system may be reset. This would be the simplest method since no distinction or detection has to be carried out to determine which one of the computers deviatae, to thereby differentiate between properly and improperly operating units. As an alternative, it may be possible of course also to reset only that one, or those of the computers which do not provide intermediate results which test properly; the remaining computer units are then placed in a set-and-hold position, so that, upon deviation only those of the computer units which actually malfunction have to be reset; other computer units, however, namely the ones which determine the malfunction or deviation from the test value are placed in the set-and-hold position without being reset. Thus, only those units whose operation was disturbed are reset.

Assuming that only that one or those of the computer units which were disturbed are reset, and that one or those of the units which determine the deviation are not considered to have been disturbed, it may be desirable, in accordance with a feature of the invention, to let those computer units which determined a deviation repeat the previous computation cycles. They are then placed on a predetermined computation cycle in a set-and-hold mode or position. Such a set-and-hold mode or position can be the beginning of a program, which might be the same as a reset to an initial point; it may, however, also be one of the preceding computation cycles, which had been carried out, and after the beginning of the run of the program. The one, or plurality of units which are placed in the set-and-hold mode then wait until the unit, or the units which were determined to provide a disturbed result have carried out its program up to the point that all the computer units can continue to carry out the respective programs, at the same time. The respective units, then, will operate in parallel, in a redundant mode. As noted above, the actual way the respective parallel-operating units arrive at the next intermediate result need not be identical.

In accordance with a feature of the invention, the computer unit, or computer units ar reset, or placed in the set-and-hold mode by that one of the units which determines that a deviation exists. This method step ensures most rapid correction of the computer subject to disturbance and further ensures high availability of units of the multi-unit system. Additionally, it is highly efficient with respect to use of equipment, since such steps can be commanded, merely by a few additional programming commands, that is, by software, without requiring additional switching components or hardware.

The intermediate information can be transmitted serially and/or in parallel.

The various alternatives discussed have different effects on the requirement for equipment and on operating speed. Serial transmission permits use of presently available data buses, although requiring more time, that is, time which may be needed to carry out computation cycles. Parallel transmission requires more components and, especially, substantially more connecting lines, and hence terminals—which may be plug-in terminals, which, as well known, are a source of disturbances, and malfunction. Parallel transmission, however, reduces the time required to transmit and test the intermediate data, so that the overall computation speed is, effectively, not affected thereby. Combining serial and parallel transmission has the advantage that the recognition of disturbances is increased since the transmission and generation of intermediate information is carried out over two paths. The disadvantage, however, is the increased connection line, terminal and interconnection requirements.

Intermediate information can be generated in various ways, for example based on arithmatic or computation or calculation and/or on status information derived from the program which is being run.

Use of status information as intermediate data information provides a reliable criterion to determine disturbances, since external influences, usually, result in disturbances of the run or course of the program, which are reflected in the status information.

Use of intermediate results of computation operation as a criterion to determine disturbances permits, also, recognition of possible errors of the data, besides errors in status information. Parallel processing of data may, however, be required which may lead to unacceptably large use of equipment, for example number of correction lines.

It is also possible, in accordance with a feature of the invention, to test intermediate results of computation operations with respect to plausibility; this can be easily carried out with minimum equipment. Combination of both criteria, with overall increased equipment requirement provides enhanced recognition of disturbances.

In accordance with a preferred feature of this invention, the intermediate information is formed as a quotient in which an end address is divided by an initial address of the program. This method permits a simple possibility to form intermediate information which is highly resistant to confusion or mix-up. The number of different possibilities of variation is high, and thus the probability of not recognizing disturbances due to ambiguous intermediate results is low. Alternatively, or additionally, the intermediate information may be formed by static and/or dynamic changes in voltage or another electrical parameter.

Forming intermediate information solely as a change in voltage is simple, but not the most reliable possibility to recognize disturbances. A combination of the possibilities, calculation or a quotient based on addresses and in addition, testing for relative voltages or similar parameters result in excellent recognition of disturbances.

In accordance with a feature of the invention, a multi-unit computer system has at least two synchronizable and sychronized computer units, connected by data and/or control buses among each other. Typically, such computer units may be used in safety calculation or computation systems, and the present invention is especially applicable thereto; a field of use is, for example, safety arrangements in automotive vehicles, such as anti-brake lock systems (ABS), passenger restraint systems such as airbags, seat belt tensioning or locking systems or the like.

The multi-unit computer system, in accordance with the invention, thus should be capable of recognizing disturbances at an early stage of carrying out the program and, additionally, of preventing the results of disturbances from, in turn, resulting in incorrect further computation and possible outputs, while permitting correction of errors so that continued operation of the computer units is impaired as little as possible.

In accordance with a feature of the invention, thus, the multi-unit system has at least two, and possibly more synchronized computer units, interconnected by data and/or control buses. Each one of the computer units functions as a generator to generate intermediate information signals, as a test value or check value source, and as a comparator for comparing the intermediate information derived from other units with the check or test data generated by any one of the specific or respective units of the system.

So constructing the computer units that they function as generators to generate the intermediate information signals permits supervision of any one of the computer units used in the system in the shortest possible time intervals and checking thereof, much faster than if only final results of the respective computer units were to be tested. The intervals during which intermediate information signals are generated depend on the number of comparisons between intermediate generated information and test or check values which are necessary in order to reliably prevent dangerous results or consequences based on disturbances, while still permitting reliable correction of errors. Suitably, an optimum compromise is selected between highest possible computation speed and largest possible number of comparisons. The intermediate information signals can be obtained in various ways; for example, intermediate results of computation operations may be used, or check computations, with known values may be carried out, and the results processed as intermediate information signals.

It is also possible to obtain status information regarding the respective programming steps being carried out and operated on in a particular computation program. Status information, again, can be used directly, or encoded. For example, a plurality of single information data can be converted into an encoded status information by a simple computation operation or step, or sequence of steps. The particular way in which intermedaite information for transmission to the other computation units or apparatus units is derived will depend, to some extent, if the transfer of data is serial, or parallel, or a combination of both serial and parallel transmission.

DETAILED DESCRIPTION

Figure 1:
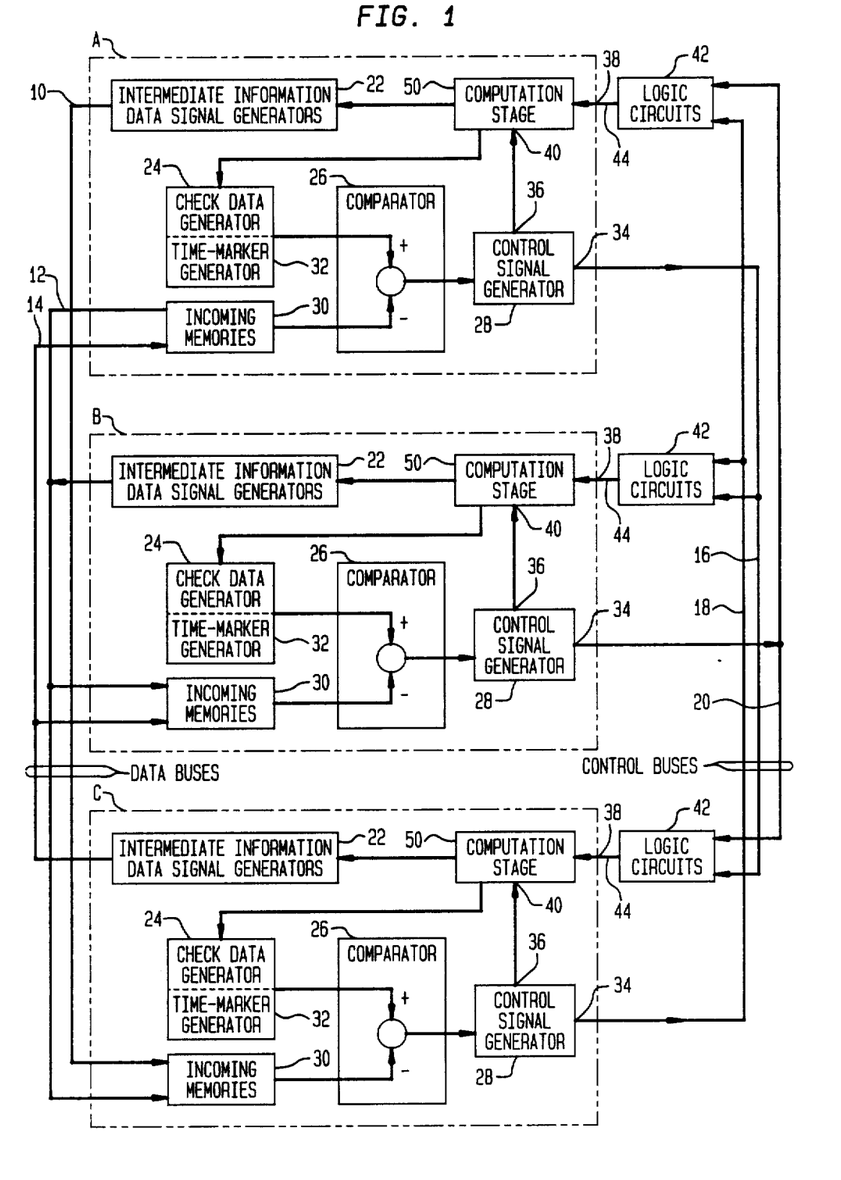
FIG. 1 is a general block circuit diagram of a multi-unit computer system, illustrating three units.

The computer units A. B. C of a multi-computer unit system are connected by data buses 10, 12, 14 and control buses 16, 18, 20. The respective blocks shown within the units A, B, C symbolize the necessary functional groups for monitoring and correction of data. The blocks can be constructed, in actual practice, as discrete; elements. Alternatively, they can be part of a program in a programmed computer unit, such as a mircocomputer. The functional blocks are identical in the respective units A, B, C and have been given the same reference numerals; they are only labeled in one of the respective blocks for clarity of the drawing.

The units A, B, C each have an intermediate information signal generator 22, to generate intermediate information signals. A check data generator 24 is coupled to one input of a comparator 26. The check data generator 24 includes a time marker generator 32. Comparator 26 compares the check data generated in generator 24 of any one unit with the intermediate information data generated in the other units, which are transmitted from the other units to an incoming memory 30 for application to the comparator 26. A control signal generator 28 is provided for internal control and for the control of transfer of data and of the other computer units. A computation stage 50 carries out the actual data processing.

Each one of the intermediate information data signal generators 22 is coupled to the associated computation stage 50 of the respective unit in order to obtain intermediate data from, or regarding the course of the program which is being carried out in the stage 50. The output of each signal generator 22 is connected to one of the data buses 10, 12, 14 which connect to the other units A, B, C which, then, are connected in the other units to the respective incoming memories 30.

The intermediate information signals are bufferstored by the memory 30 in order to permit later comparison with check data by the comparator 26, to which they are then connected. Accordingly, an output terminal of each one of the memories 30 is coupled to an input of the respective comparator 26, the other input for comparison purposes, of which, is connected to an output of the respective local check data generator 24.

The check data generator 24 can provide the comparator 26 with fixed check data, as well as check data which change as the program in the computation stage 50 is run. In order to permit the possibility of changing checked data, the input of the check data generator 24 is also coupled to the computation stage 50, so that the check data generator 24 can receive data regarding the course and state of the program being run in the computation stage 50.

The time marker generator 32, part of the check data generator 24, generates time marker which, besides the checking or testing of intermediate information, can also monitor the proper time of receipt of the intermediate information from the other units. The memories 30 are so constructed that they can receive timing information, that is, information regarding the timing of intermediate information signals derived from other units. An output of the comparator 26 is connected to an input of the control signal generator 28, so that, if the intermediate information tested in the comparator shows a difference with respect to the time markers, control signals can be generated which are applied to output terminals 34, and 36 of the control signal generator. The output terminal 34 generates a RESET signals, and the output terminal 36 generates a set-and-hold signal.

The RESET signal, available at output terminal 34, resets the remote units. The set-and-hold signal controls the local unit via an internal connection to a set-and-hold input 40 of the respective computation stage 50.

To reduce the number of control lines necessary, external logic circuits 42 are located between the control outputs 34 and the reset terminal 38 of the respective computation stages 50, the logic circuits 42 logically steering the control signals received from the remote units and combining these signals on a single output terminal or line 44. These logic circuits 42 may, for example, be OR gates or the like.

Figure 2:
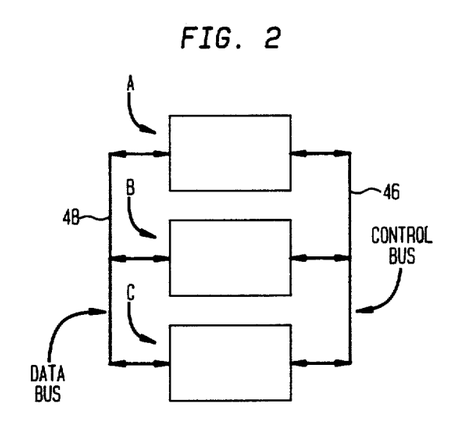
FIG. 2 is an abbreviated block diagram showing another arrangement of the computer units.

Further reduction of the number of interconnecting buses or lines can be obtained by interconnecting the respective units A, B, C by bi-directional control lines and data lines, as illustrated in FIG. 2. The control lines 46 are bi-directional; data exchange of intermediate information is carried out over bi-directional data buses 48.

Operation

During operation of the units A, B, C, generator 22 derives from the computation stage 50, in predetermined intervals, intermediate information data and provides the respective intermediate information data signals to the remaining units A, B, C via the data lines or buses 10, 12, 14 or the bi-directional buses 48 (FIG. 2). In the example, status information is derived which is obtained by generating a quotient formed of the final address divided by the initial address of the program in the computation stage 50.

The locally generated status information, for example generated in unit A is thus applied to the units B and C. Similar intermediate information data generated in unit B is transmitted to the units A and C and, likewise, similar data derived in the unit C are applied to the units A and B.

The received status information, as well as the time of receipt of the status information, is stored in the incoming memories 30. At the same time, that is, simultaneously with transmission of the status information, or time-shifted with respect thereto, check data are generated in the check data generator 24 of the respective local units. The internal or local check data, and the remote or foreign status information are then compared in each one of the units A, B, C in the respective comparators 26.

Let it be assumed that the result of the comparison shows agreement between the local check data and the foreign or remote status information. This agreement is communicated by the comparator 26 to the control signal generator 28 in a form which does not cause the control signal generator 28 to provide an output. Consequently, the local computation stage 50, as well as the computation stages 50 of the foreign or remote units continue in their computation cycles. Under ordinary conditions, thus, this test-and-proceed sequence or cycle will occur after a predetermined number of supervised computation or processing cycles in the computation stage 50 of each of the units.

Let it next be assumed that one of the units, for example unit A does not compute properly since its computation stage was subject to a disturbance, for example due to an externally induced, or transmitted switching pulse. This disturbance may, for example, have caused jumping over a program step. Consequently, the next status information will differ from the data derived from the check data generator. This difference is detected in a comparator 26 which provides a deviation output in at least one of the units BC. Let is be assumed that the deviation is first recognized by the comparator 26 of unit B. This first recognition will cause the comparator 26 to provide the deviation signal to its control signal generator 28 which will have this result: the computation stage 50 of unit B will be placed in the set-and-hold mode, and the units A and C will be RESET.

The units A and C then process their program from the beginning, or, selectively, from the previous checking step which was correct, and where no deviation had been detected. In the unit B, the operation will depend on which programming status the set-and-hold information was obtained. It may be the beginning of the program, or a different program status, that is, an intermediate stage which has been reached during a predetermined passage of programming cycles or sequences. If the programming status is the one after the first computation cycle, unit B waits until the units A and C have passed through that computation cycle and then - unless in the meantime a disturbance is again detected, continues its further computation cycle in common and simultaneously with those of the units A and C.

Figure 3:
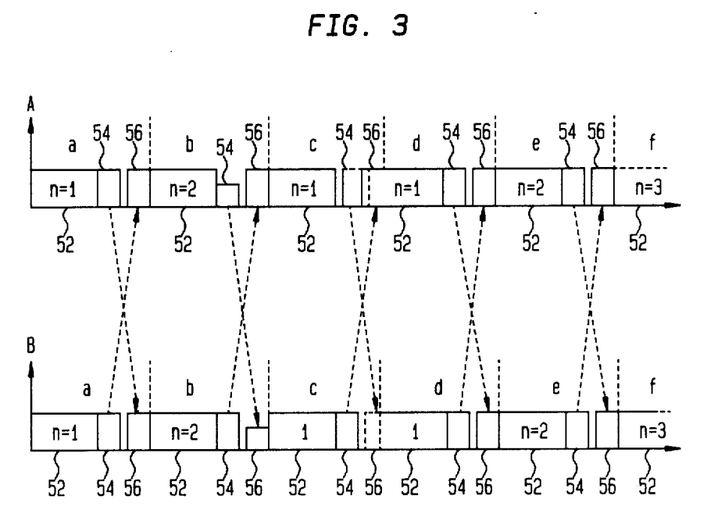
FIG. 3 shows the temporal course of computation cycles, transmission of intermediate information signals, comparison between intermediate information signals and check or test values, and further computation courses, in a multi-computer unit system having two computer units.

The preceding can best be understood be reference to FIG. 3 which shows, for simplicity, a system having only two units. Showing the arrangement with three units would unduly complicate the presentation in the graphic form of the figure.

FIG. 3, thus, graphically shows how intermediate information signals are transmitted, and comparison of intermediate information with check data.

Let it be assumed that the two units A and B are operating in synchronism which is the normal course, so that corresponding time intervals can be illustrated in vertical alignment in FIG. 3. The time axes are divided in six time windows, a. b, . . . e and f. The respectively monitored computation cycles or sequences occur in the respective time windows. The largest portion of the time window is used for actual signal processing as illustrated by the window division 52. The order numbers n of the respectively run computation cycles are illustrated by the arabic numbers, in combination with n. A programming status is designated by a single, separate number which also represents the programming address. Time window portions or sections or slots 54 are also shown besides the computation cycles, above referred to, to provide time for transmission of intermediate information data and reception thereof. The portions or sections 56 are used for comparison of the intermediate information data with check data.

Each computation cycle is joined next by the period to transmit the intermediate information data signals, which is then followed by the time for testing the intermediate information signals against the check or test data in the comparator. Thereafter, a new time sequence or cycle will follow. The arrows between the blocks of the graphs A and B illustrate the direction in which the intermediate information data signals are transmitted.

Let it be assumed, first, that both units A and B start at the beginning of the program for consistency with the check data.

The second computation cycle $n=2$ then follows in the time window b. Let it be assumed that a disturbance occurs in the unit A and the intermediate information which is transmitted to the unit B is wrong. The unit B, thereof, determines the deviation and, as a consequence, resets the unit A to the program status $n=1$ and places itself on the programming status after the first programming cycle. The unit B remains in the programming status No. 1, while the unit A repeats the first computation cycle $n=1$. Let it be assumed that the disturbance continues, or a new disturbance occurs with respect to the unit A in the time window c during the time interval 52. In this second disturbance, the intermediate information is correct, but is transmitted with some delay, as shown by the time section 56. The unit B determines that the time period 56 within the window c deviates from the appropriate value and again resets the unit A. Unit B, however, continues in the set-and-hold mode, remaining on the programming status No. 1 after the first computation cycle.

Let it be assumed, next, that the disturbance has dissipated itself—for example a pulse which caused the disturbance has ceased, and its effect likewise has been dissipated, so that the first programming step n=1 is properly run in the time interval d by the unit A. The mutually exchanged information is checked, and agreement is determined so that, during a subsequent time windows e and f, the subsequent computation cycle n=2 and n=3 can be run, as programmed.

The check data generator 24 may take various forms. For example, the check data generator 24 may provide or process its own intermedaite data information, so that it can be provided in the form of check data signal, or reference signals with respect to the received intermediate information data signals from other units. The check data or reference data can be obtained in the same manner as the originally supplied data or differently. In accordance with a preferred feature of the invention, the data derived to form the test or check or reference data are obtained in a manner different from the derivation of the computed data in the different units, so that the probability that disturbances in two units will have the same changes in data or signals is a minimum. External influences, thus, will have different effects in different units so that the possibility that a disturbance will have compensating effects in different units, which compensate each other, is largely eliminated.

The use of comparators has the advantage that the test or comparison result can be used to control the local unit as well as other computation units of the multi-unit system. These results, obtained by comparison, can thus provide immediate outputs in order to prevent undesirable consequences to occur, and to correct errors rapidly. Rapid error correction permits further data processing at the earliest moment in time, so that any gaps can readily be bridged. Suitable control is obtained by providing the control signal generator 28, coupled to the output of comparator 26.

The function described can be carried out by a hard wired, or fixed wired unit, interconnecting functional blocks of the computer; it is, however, simpler, both based on components as well as space to provide for the blocks by function, in form of a computation program, in which the respective components are already present, and used for processing of data.

In accordance with a preferred feature of the invention, each one of the units A, B, C has its own incoming memory 30 to receive the incoming intermediate information signals for storage with the locally generated test or reference or check data. This arrangement permits serial transmission of intermediate information data signals and ensures that, if more than two units are present, all intermediate information data signals are available for comparison with the reference or check or test data. Additionally, when forming the check data, any temporal shift to generate intermediate information signals can readily be obtained. The probability that only one of the respective steps is disturbed, so that rapid recognition of disturbances is obtained, is enhanced thereby.

Preferably, the check data generator 24 includes the time marker, or timing signal generator 32. Generating time markers has the additional advantage of providing a further tet possibility or reference level. It permits checking the intermediate information signals not only with respect to their signals values, but also with respect to the appropriate time instant of reception in the remote units.

In accordance with an actual and suitable embodiment, the control signal generator 28 has two output terminals - one to effect resetting of the computation stages and the other to effect setting and holding of the computation stages at respective points in their program.

The arrangement permits differentiating between units which have information deviating from the standard, be it signals or time of arrival, and the unit or units which do not have deviating information. Thus, units which require correction can be differently controlled than those which do not. For example, the unit which does not deviate can be set on a different programming status than the first or initial program step. Thus, repetition of correctly carried out computation cycles can be avoided. This increases operating reliability of a multi-unit computer system, since effects of disturbances which occur during re-computation at the computer unit which had previously correctly calculated are effectively avoided.

Logical connecting circuits are preferably provided in which the synchronizing outputs of a plurality of units are combined to a single control bus. Such logic circuits are shown schematically at 42 in FIG. 1, although bi-directional buses with their own suitable incoming and outgoing logic (FIG. 2) can also be used. The different types of logic circuits and how the units are interconnected is well known in microcomputer technology and any suitable system and/or programming can be employed. Bi-directional control can be used to connect the synchronizing signal outputs of the various units and to combine the outputs into a single control line 44. The use of bi-directional control buses or lines and data buses or lines has the additional advantage, at the cost of additional equipment and logic circuits or function, however, that the number of connecting lines and hence terminals can be reduced. Particularly in automotive vehicles, and in other mobile applications, where shock, vibration and the like are a problem, reduction in the number of connecting lines and terminals is desirable since connecting lines and terminals are a frequent source of malfunction. It is also possible to combine the control and data lines into common buses, at the cost of additional logic and steering units.

We claim:

1. Method of monitoring and error-correcting a plurality of computer apparatus units (A,B,C), forming a part of a multi-computer system, which process data in data processing cycles,
   wherein each of said units process data and wherein data buses (10,12,14) and control buses (16,18,20; 46,48) are provided, interconnecting the plurailty of computer apparatus units (A,B,C) and synchronizing operation of the respective units, comprising the steps of
   generating intermediate information data in each of said units at predetermined time intervals;
   transmitting said intermediate information data generated in any one unit to each of the others of said units in the system;

comparing said intermediate information data with check data generated within the respective units and, if the comparison in any one of the units between the intermediate information data and the check data (a) determine coincidence, continuing processing the data in the units, or (b) detects a deviation, suppressing a subsequent computation cycle of only that one unit or those of the units in which the deviation was detected, and commanding repetition of at least one preceding computation cycle by said at least one of the units in which the deviation was detected, and further including the steps of placing those computer units from which coincidence has been detected, in a "set-and-hold" mode.

2. The method of claim 1, wherein the intermediate information data are transmitted in a first time interval or slot from any one of said units to other units;

wherein said so transmitted information data are recorded or entered in a memory in a second, succeeding time interval, and compared with said check data.

3. The method of claim 1, wherein the step of comparing said intermediate information data comprises comparing at least one of: the information content of said intermediate information data with check data, or the time of arrival of said intermediate information data with a check time.

4. The method of claim 1, wherein, if the comparison detects a deviation, all computer apparatus units are commanded to repeat at least one preceding computation cycle.

5. The method of claim 1, wherein said step of generating said intermediate information data comprises at least one of:

obtaining intermediate results based on data processing operations during said processing cycles;

generating status information of the program controlling the respective processing cycles.

6. The method of claim 5, wherein said step of generating said intermediate information data comprises forming a quotient by dividing a final address by an initial address of processing cycles in the processing program.

7. The method of claim 1, wherein the step of commanding repetition of at least one preceding computation cycle comprises controlling that one of the computer units which detects the deviation to, in turn, control the at least one of the units at which the deviation was detected to repeat at least one preceding computation cycle.

8. The method of claim 7, including the step of placing that one of the computer units which has detected a deviation of intermediate information data from said check data of another computer apparatus unit, to place itself into a "set-and-hold" mode.

9. The method of claim 1, wherein the step of transmitting said intermediate information data from any one of said units to all other ones of said units comprises serially transmitting said information data.

10. The method of claim 1, wherein the step of transmitting said intermediate information data from any one of said units to all other ones of said units comprises transmitting said information data in parallel.

11. The method of claim 1, wherein said step of generating said intermediate information data comprises generating at least one of: static voltage changes; or dynamic voltage changes; or computing intermediate results based on said processing cycles; or obtaining status information based on the processing cycles commanded by a program controlling said processing cycles.

12. Method of monitoring and error-correcting a plurality of computer apparatus units (A,B,C), forming a part of a multi-computer system, which process data in data processing cycles, wherein each of said units process data and wherein data buses (10,12,14) and control buses (16,18,20; 46,48) are provided, interconnecting the plurality of computer apparatus units (A,B,C) and synchronizing operation of the respective units, comprising the steps of generating intermediate information data in each of said units at predetermined time intervals;

transmitting said intermediate information data generated in any one unit to each of the others of said units in the system;

comparing said intermediate information data with check data generated within the respective units and, if the comparison in any one of the units between the intermediate information data and the check data (a) determine coincidence, continuing processing the data in the units, or (b) detects a deviation, suppressing a subsequent computation cycle of at least that one of the units in which the deviation was detected, and commanding repetition of at least one preceding computation cycle by said at least one of the units in which the deviation was detected, and wherein, upon detection of coincidence, that one of the computer apparatus units which detects the coincidence is placed in a set-and-hold mode;

and wherein, upon detection of a deviation of the information data from any one other computer apparatus unit, all other computer apparatus units are commanded to repeat at least one preceding computation cycle.

13. Multi-computer apparatus unit (A,B,C) computer system in which said units process in processing cycles comprising, means for monitoring an error correction of data being processed within said units, data buses and control buses (10, 12, 14; 16, 18, 20; 46, 48) interconnecting said plurality of computer apparatus units (A, B, C), and synchronizing operation of the respective units, each said unit comprising, in accordance with the invention, an intermediate data signal generator (22) generating intermediate information data signals;

a check or test data signal generator (24) including a time marker generator (32);

a comparator (26) connected to compare intermediate information data received from computer units other than a respective computer unit, and connected for comparing intermediate information from said intermediate information data signal generators of said other units with the check data generated by the check data generator of the respective units; and a control signal generator (28) connected to receive an output from said comparator, and providing control output signals to the respective computer unit and the other computer units which have characteristics depending upon whether said comparison in the comparator between the intermediate information data and the locally generated check data in the respective apparatus unit (a) detects coincidence; or
(b) detects a deviation.

14. The system of claim 13, further including an incoming memory (30) in each said computer units and buffer-storing said intermediate information data received from the intermediate information data signal generators of other than the respective unit.

15. The system of claim 13, wherein at least one of: the control bus (46) or the data bus (48) comprises of bi-directional bus.

16. The system of claim 13, wherein at least one of: said control buses and said data buses interconnecting said units (A, B, C) are common to at least two of said units.

17. Multi-computer apparatus unit (A,B,C) computer system, in which said units process data in processing cycles comprising, means for monitoring an error correction of data being processed within said units, data buses and control buses (10, 12, 14; 16, 18, 20; 46, 48) interconnecting said plurality of computer apparatus units (A, B, C), and synchronizing operation of the respective units, each said unit comprising, in accordance with the invention, an intermediate data signal generator (22) generating intermediate information data signals;

a check or test data signal generator (24);

a comparator (26) connected to compare intermediate information data received from computer units other than a respective computer unit, and connected for comparing intermediate information from said intermediate information data signal generators of said other units with the check data generated by the check data generator of the respective units; and a control signal generator (28) connected to receive an output from said comparator, and providing control output signals to the respective computer unit and the other computer units which have characteristics depending upon whether said comparison in the comparator between the intermediate information data and the locally generated check data in the respective apparatus unit (a) detects coincidence; or
(b) detects a deviation; and wherein each of said units includes a computation stage (50) carrying out said computation cycles, said computation stage having a "set-and-hold" terminal (40) coupled to the control signal generator, and a RESET terminal (38) to reset the respective computation stage to repeat at least one computation cycle;

and wherein the control signal generator (28) of any one of said units is connected to the set-and-hold terminal of the respective unit and to the reset terminals of the other units.

18. The system of claim 17, further including logic circuits (42) coupled to the control buses (16, 18, 20;46) connecting said units and providing a single output on a single control line (44) to the reset terminal (38) of the computation stages of the respective units.

* * * * *